April 7, 1970        H. METTIG        3,504,769

INTERNAL COMBUSTION ENGINE INCLUDING LUBRICATION SYSTEM

Filed Aug. 21, 1967        3 Sheets-Sheet 1

United States Patent Office 3,504,769
Patented Apr. 7, 1970

3,504,769
INTERNAL COMBUSTION ENGINE INCLUDING LUBRICATION SYSTEM
Hermann Mettig, Rodenkirchen, Germany, assignor to Klockner-Humboldt-Deutz Aktiengesellschaft, Cologne-Deutz, Germany
Filed Aug. 21, 1967, Ser. No. 661,907
Claims priority, application Germany, Aug. 30, 1966, K 60,132
Int. Cl. F16n 13/02; F01m 11/02
U.S. Cl. 184—6                              5 Claims

ABSTRACT OF THE DISCLOSURE

A lubricating oil circuit for a reciprocable piston internal combustion engine having a housing comprising a crank case with an end face and with a lubricating oil distributing conduit in said crank case. A pressure cast gear box cover is connected to said end face and is provided with a receiving surface internally for receiving a lubricating oil filter, said gear box cover also being adapted to receive a lubricating oil pump. The gear box cover has cast directly therein first conduit means establishing communication between the pressure side of the pump in said gear box and the inlet of said filter and also has cast directly therein second conduit means establishing communication between the outlet of said filter and said lubricating oil distributing conduit in the engine housing including said crank case.

---

The present invention relates to a reciprocable piston internal combustion engine with a lubricating oil filter and a lubricating oil pump.

It is an object of this invention, with an internal combustion engine of the above mentioned type, to provide a particularly simple construction of the lubricating oil filter without the provision of a filter holder or without special machining on the crank-case.

It is another object of this invention to provide an internal combustion engine as set forth in the preceding paragraph, in which the connecting conduits from the pump to the filter are greatly simplified.

These and other objects and advantages of the invention will appear more clearly from the following specification in connection with the accompanying drawings, in which.

Figure 1:
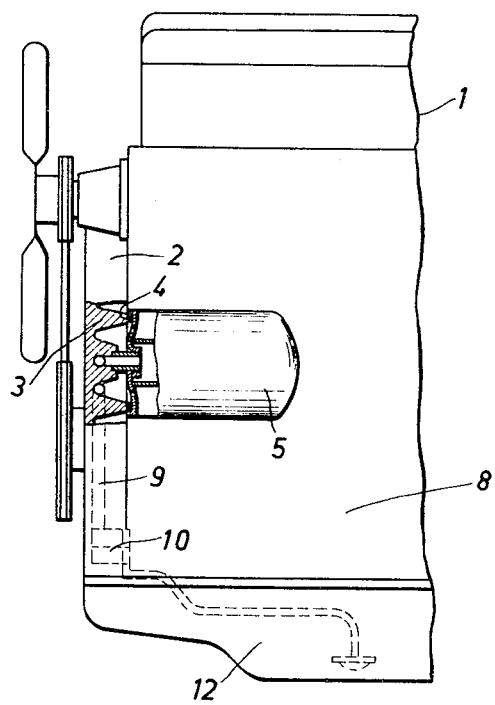
FIG. 1 is a side view of a reciprocable piston internal combustion engine according to the invention.
Figure 2:
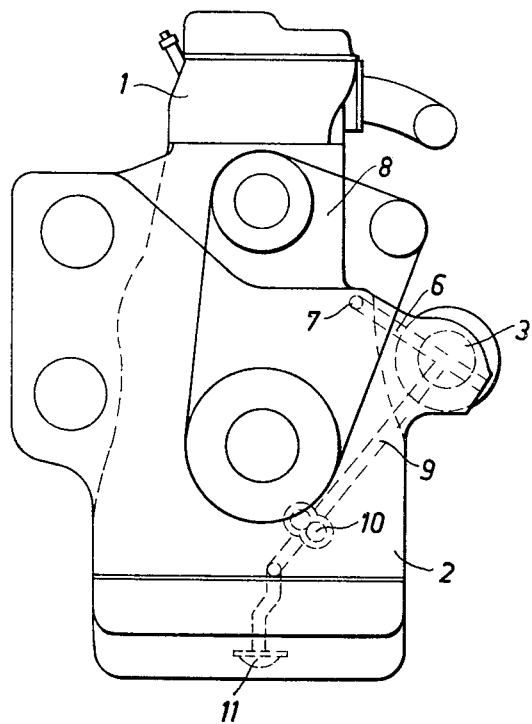
FIG. 2 is a front view of the machine according to FIG. 1.
Figure 3:
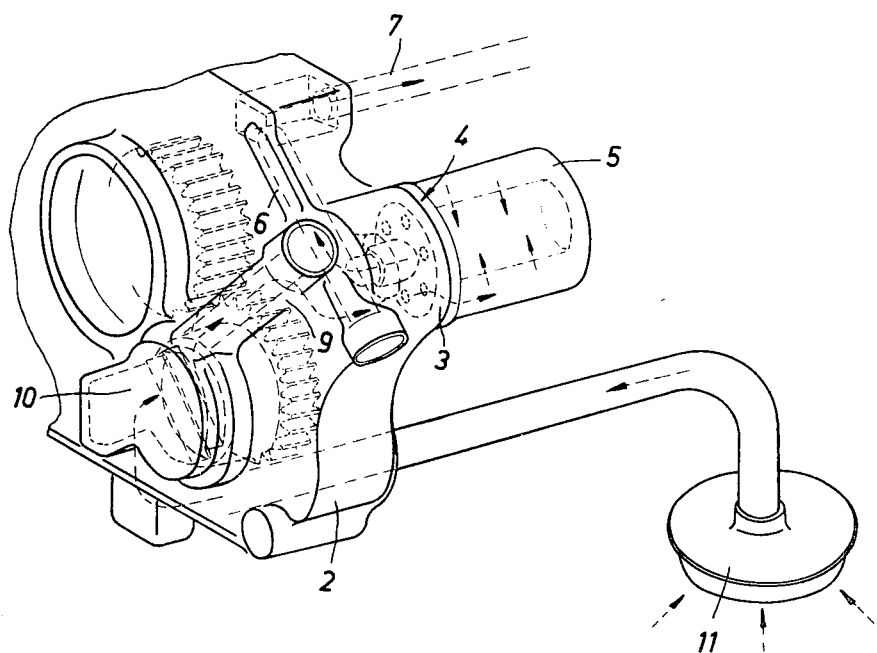
FIG. 3 illustrates details of the gear transmission housing cover aind of the lubricating oil filter construction.

The above outlined objects have been realized according to the present invention by a pressure-cast gear housing cover equipped with surfaces for the lubricating oil filter.

Since the gear box cover is pressure-cast, the surfaces for receiving the lubricating oil filter and/or the lubricating oil pump with the gear box cover may be produced in one working operation.

According to a further development of the invention, the transfer conduits from the lubricating oil pump to the lubricating oil filter and from the lubricating oil filter to the distributing conduit of the crank housing are cast into the walls of the pressure-cast gear box cover. As a result thereof, additional conduits are avoided and short connections low in losses are realized between the lubricating oil pump and the lubricating oil filter.

According to a still further development of the invention, the pressure-cast gear box cover has a portion thereof protrude beyond the cross-sectional contour of the combustion engine housing, said portion having a receiving surface facing the internal combustion engine housing for the said lubricating oil filter. In this way a special filter holder and/or a corresponding machining of the crank housing will be avoided. In view of this arrangement, it is also possible to arrange the lubricating oil filter in a space-saving manner parallel to the internal combustion engine housing. The lubricating oil filter will in this way be easily accessible and thus can be exchanged in a minimum of time.

Referring now to the drawings in detail, one end face of the internal combustion engine 1 has arranged thereon a pressure-cast gear box cover 2. This cover 2 has a portion 3 thereof protruding beyond the cross-sectional contour of the internal combustion engine housing, said portion 3 having a receiving surface 4 which faces the engine housing and is intended for receiving the lubricating oil filter 5. The oil filter 5 is arranged parallel to the longitudinal axis of the reciprocable piston internal combustion engine 1 and through a conduit 6 communicates with the distributing conduit 7 of the crankcase 8 and through a conduit 9 communicates with the lubricating oil pump 10. The conduits 6 and 9 are provided in the walls of the pressure-cast gear box cover 2. The lubricating oil pump 10, through the intervention of a strainer 11, draws the lubricating oil from the oil pan 12 and conveys it through the lubricating oil filter 5 to the distributing conduit 7.

What I claim is:
1. A reciprocable piston internal combustion engine having gears and a housing including a gear box and crank case with an end face, and a pressure cast gear box cover connected to said end face and in combination provided with a receiving surface of said pressure cast gear box cover which faces the engine housing, a lubricating oil pump carried adjoining said gear box cover, a lubricating oil filter mounted relative to the reciprocable piston internal combustion engine and located internally thereof, conduit forming means establishing communciation by way of said gear box cover from the crank case to said lubricating oil pump as well as said oil filter to said engine, said gear box cover also having provision to receive said lubricating oil pump thereon.

2. An internal combustion engine according to claim 1, in which there is a cross-sectional contour of said crank case complementary to said gear box cover and a receiving surface portion is formed for the lubricating oil filter and constitutes an integral internal part of said gear box cover, said receiving surface portion having a position that protrudes to project laterally toward and beyond edge limits of the cross-sectional contour of said crank case.

3. An internal combustion engine according to claim 1, in which said crank case has a distributing lubricating oil conduit as part of said conduit forming means, and in which said gear box cover has cast directly therein first conduit means having an inlet opening for communication with the pressure side of said lubricating oil pump in said gear box cover and also having an outlet opening for communication with an inlet of said lubricating oil filter internally on said receiving surface of said pressure cast gear box cover, said gear box cover also having cast directly therein second conduit means having one end in communication with said distributing lubricating oil conduit of said crank case and having its other end arranged for communication with an outlet of said lubricating oil filter through said pressure cast gear box cover.

4. An internal combustion engine according to claim 1, in which said receiving surface portion of said gear box cover internally is located transverse to longitudinal axis of the reciprocable piston internal combustion engine and said lubricating oil filter is carried parallel to the longitudinal axis of the reciprocable piston internal combustion engine directly internally by said pressure cast gear box cover.

5. An internal combustion engine according to claim 1, in which said gear box cover has cast directly therein a minimum of short conduit means from said lubricating oil pump directly to oil filter inlet spaced from further conduit means for outlet communication to said engine from said oil filter carried by said gear box cover which eliminates and obviates special external filter holder and machining of the housing.

References Cited

UNITED STATES PATENTS

| | | | |
|---|---|---|---|
| 1,846,072 | 2/1932 | Whyte | 184—6 |
| 1,913,193 | 6/1933 | Crawford | 184—6 |
| 2,801,006 | 7/1957 | Hultgren et al. | 184—6 XR |
| 2,897,966 | 8/1959 | Humbert | 184—6 XR |
| 3,023,846 | 3/1962 | Kolbe | 184—6 |
| 3,087,582 | 4/1963 | Potter | 184—6 |

FRED C. MATTERN, Jr., Primary Examiner

M. A. ANTONAKAS, Assistant Examiner

U.S. Cl. X.R.

123—196, 198